United States Patent
Ahn

(10) Patent No.: US 8,634,035 B2
(45) Date of Patent: Jan. 21, 2014

(54) LIQUID CRYSTAL DISPLAY DEVICE

(75) Inventor: Hyeong-Cheol Ahn, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 245 days.

(21) Appl. No.: 13/064,807

(22) Filed: Apr. 18, 2011

(65) Prior Publication Data

US 2012/0154705 A1    Jun. 21, 2012

(30) Foreign Application Priority Data

Dec. 16, 2010   (KR) .................. 10-2010-0129282

(51) Int. Cl.
    *G02F 1/1343*   (2006.01)
(52) U.S. Cl.
    USPC ............................................ 349/38; 349/144
(58) Field of Classification Search
    USPC ......... 349/38, 43, 46, 129, 139, 39, 138, 144, 349/143; 445/24; 345/204; 257/72, 257/E29.003
    See application file for complete search history.

(56) References Cited

U.S. PATENT DOCUMENTS

| 5,923,390 A | 7/1999 | Jung Mok et al. | |
| 7,663,617 B2 * | 2/2010 | Shin et al. | 345/204 |
| 2008/0068551 A1 * | 3/2008 | Lee et al. | 349/144 |
| 2008/0121893 A1 * | 5/2008 | Kim et al. | 257/72 |
| 2008/0303965 A1 | 12/2008 | Kim | |

FOREIGN PATENT DOCUMENTS

| KR | 1999-003712 | 1/1999 |
| KR | 10-2003-0058545 A | 7/2003 |
| KR | 10-2008-0044047 A | 5/2008 |
| KR | 10-2008-0107149 A | 12/2008 |

* cited by examiner

*Primary Examiner* — Thoi Duong

(74) *Attorney, Agent, or Firm* — Lee & Morse, P.C.

(57) ABSTRACT

A liquid crystal display device includes a pixel region defined by a gate line and a data line, a thin film transistor in the pixel region, and a storage line in the pixel region. The storage line includes a first portion extending in a direction parallel to the gate line, and a second portion split from the first portion in a direction toward the pixel electrode and extending in a direction parallel to the data line. A common electrode corresponds to the pixel region on a second substrate combined with a first substrate to accommodate a liquid crystal layer, and an opening in the common electrode corresponds to a pixel electrode. The drain electrode includes a first region overlapping the first portion of the storage line and a second region overlapping the second portion of the storage line. The second portion of the storage line and the second region of the drain electrode correspond to the opening.

21 Claims, 6 Drawing Sheets

LIQUID CRYSTAL DISPLAY DEVICE

CROSS-REFERENCE TO RELATED PATENT APPLICATION

This application claims the benefit of Korean Patent Application No. 10-2010-0129282, filed on Dec. 16, 2010, in the Korean Intellectual Property Office, and entitled: "Liquid Crystal Display Device," the disclosure of which is incorporated herein in its entirety by reference.

BACKGROUND

1. Field

Embodiments relate to a liquid crystal display device, and to an aperture ratio of a liquid crystal display device.

2. Description of the Related Art

A liquid crystal display device may include an array substrate, a color filter (C/F) substrate facing the array substrate, and a liquid crystal layer between the array substrate and the C/F substrate. The array substrate may include a plurality of pixels as minimum units for displaying an image.

SUMMARY

Embodiments may be realized by providing a liquid crystal display device including a pixel electrode formed on a first substrate in a pixel region defined by a gate line and a data line crossing each other, and a thin film transistor formed on the first substrate in the pixel region that includes a gate electrode, a semiconductor layer insulated from the gate electrode, and a source electrode and a drain electrode electrically connected to the semiconductor layer. The device also includes a storage line formed on the first substrate in the pixel region that includes a first portion extending in parallel with the gate line, and a second portion split from the first portion in a direction toward the pixel electrode and extending in parallel with the data line. The device further includes a common electrode formed to correspond to the pixel region on a second substrate combined with the first substrate to accommodate a liquid crystal layer, and an opening formed in at least a portion of the common electrode to correspond to the pixel electrode. The drain electrode includes a first region overlapping the first portion of the storage line and a second region extending to overlap the second portion of the storage line. The second portion of the storage line and the second region of the drain electrode extend to correspond to the opening and overlap the opening.

The liquid crystal display device may further include a gate insulation layer formed between the second portion of the storage line and the second region of the drain electrode.

The second portion of the storage line, the gate insulation layer, and the second region of the drain electrode may form an auxiliary capacitor, and the auxiliary capacitor may overlap the opening.

The liquid crystal display device may further include a contact electrode formed at the same level as the pixel electrode, and electrically connected to the pixel electrode and the drain electrode.

The first portion of the storage line formed to overlap the contact electrode, and the first region of the drain electrode insulated from the first portion of the storage line may form a main capacitor.

Embodiments may also be realized by providing a liquid crystal display device including a pixel electrode formed on a first substrate in a pixel region including a first subpixel region and a second subpixel region. The pixel electrode includes a first pixel electrode formed in the first subpixel region and a second pixel electrode formed in the second subpixel region. The device also includes a thin film transistor formed on the first substrate in the pixel region, and including a gate electrode, a semiconductor layer insulated from the gate electrode, and a source electrode and a drain electrode electrically connected to the semiconductor layer. The device further includes gate line electrically connected to the gate electrode and crossing between the first and second subpixel regions, a storage line formed on the first substrate in the pixel region and including a first portion extending in parallel with the gate line, and a second portion split from the first portion in a direction toward the pixel electrode and extending perpendicularly to the gate line. The device also includes a common electrode formed to correspond to the pixel region on a second substrate combined with the first substrate to accommodate a liquid crystal layer, and an opening formed in at least a portion of the common electrode to correspond to the pixel electrode. The drain electrode includes a first region overlapping the first portion of the storage line and a second region extending to overlap the second portion of the storage line. The second portion of the storage line and the second region of the drain electrode extend to correspond to the opening and overlap the opening.

The thin film transistor may be formed between the first and second subpixel regions.

The first portion of the storage line may be formed to cross between the first and second subpixel regions.

The opening may include a first opening formed to correspond to at least a portion of the first pixel electrode, and a second opening formed to correspond to at least a portion of the second pixel electrode.

The second portion of the storage line and the second region of the drain electrode may extend to correspond to the first opening and may overlap the first opening.

The liquid crystal display device may further include a gate insulation layer formed between the second portion of the storage line and the second region of the drain electrode.

The second portion of the storage line, the gate insulation layer, and the second region of the drain electrode may form an auxiliary capacitor, and the auxiliary capacitor may overlap the first opening.

The liquid crystal display device may further include a contact electrode formed at the same level as the first and second pixel electrodes, and electrically connected to the first and second pixel electrodes, and the contact electrode may be formed between the first and second pixel electrodes.

The first portion of the storage line may be formed to overlap the contact electrode, and the first region of the drain electrode insulated from the first portion of the storage line may form a main capacitor, and the main capacitor may be formed between the first and second subpixel regions.

Embodiments may also be realized by providing a liquid crystal display device including a pixel electrode formed on a first substrate in a pixel region defined by a gate line and a data line crossing each other. The pixel region includes a first subpixel region and a second subpixel region, and the pixel electrode includes a first pixel electrode formed in the first subpixel region and a second pixel electrode formed in the second subpixel region. The device also includes a thin film transistor formed on the first substrate in the pixel region, and including a gate electrode, a semiconductor layer insulated from the gate electrode, and a source electrode and a drain electrode electrically connected to the semiconductor layer. The device further includes a first storage line formed on the first substrate to cross between the first and second subpixel regions, and including a first portion extending in parallel with the gate line, and a second portion split from the first portion in a direction toward the pixel electrode and extending in parallel with the data line. The device also includes a common electrode formed to correspond to the pixel region on a second substrate combined with the first substrate to accommodate a liquid crystal layer, and an opening formed in at least a portion of the common electrode to correspond to the pixel electrode. The drain electrode includes a first region overlapping the first portion of the first storage line and a second region extending to overlap the second portion of the first storage line. The second portion of the first storage line extends to correspond to the opening and overlaps the opening.

The thin film transistor may be formed under the second subpixel region on a plane.

The gate line may be electrically connected to the gate electrode, and may be formed under the second subpixel region in parallel with the first storage line on a plane, and the liquid crystal display device may further include a second storage line formed under the second subpixel region in parallel with the gate line on the plane.

The opening may include a first opening formed to correspond to at least a portion of the first pixel electrode, and a second opening formed to correspond to at least a portion of the second pixel electrode.

The second portion of the first storage line may be split from the first portion of the first storage line in two directions, may extend to correspond to the first and second openings, and may overlap the first and second openings.

The liquid crystal display device may further include a gate insulation layer and a passivation layer formed between the second portion of the first storage line and the first and second pixel electrodes.

The second portion of the first storage line, the gate insulation layer, the passivation layer, and the first pixel electrode may form a first auxiliary capacitor, the first auxiliary capacitor may overlap the first opening, the second portion of the first storage line, the gate insulation layer, the passivation layer, and the second pixel electrode may form a second auxiliary capacitor, and the second auxiliary capacitor may overlap the second opening.

The liquid crystal display device may further include a connection electrode formed at the same level as the first and second pixel electrodes, and electrically connected to the first and second pixel electrodes, and the connection electrode may be formed between the first and second pixel electrodes.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
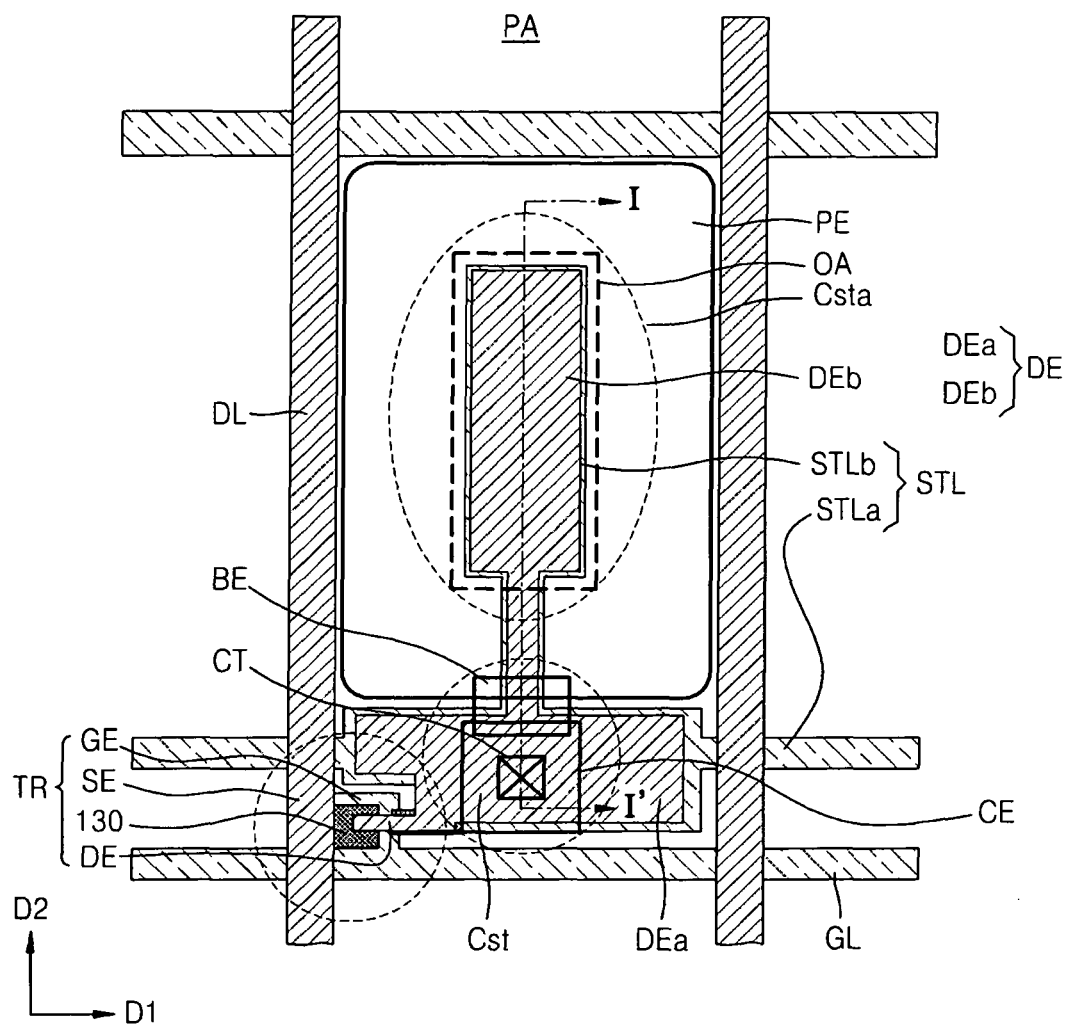
FIG. 1 illustrates a plan view of a liquid crystal display device, according to an exemplary embodiment.

While exemplary embodiments are susceptible to various modifications and alternative forms, specific embodiments thereof are shown by way of example in the drawings and will herein be described in detail. It should be understood, however, that there is no intent to limit exemplary embodiments to the particular forms disclosed, but conversely, exemplary embodiments are to cover all modifications, equivalents, and alternatives falling within the spirit and scope of the invention. In the following description, a detailed description of known functions and configurations incorporated herein will be omitted when it may make the subject matter of the embodiments unclear.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of exemplary embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the attached drawings.

Figure 2:
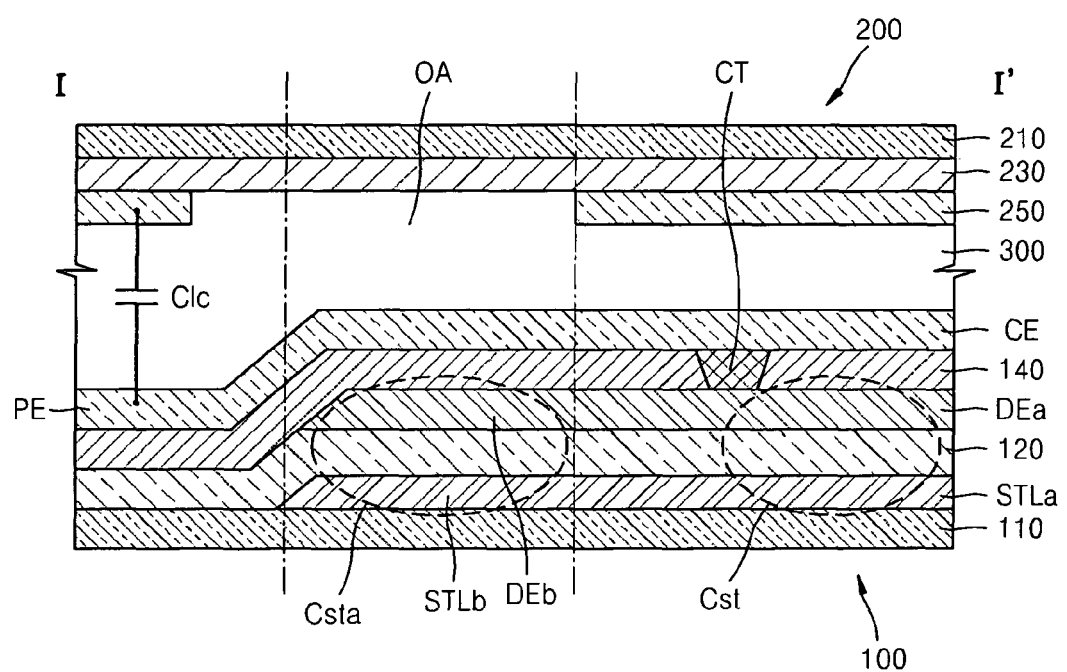
FIG. 2 illustrates a cross-sectional view cut along a line I-I' of FIG. 1.

FIG. 1 illustrates a plan view of a liquid crystal display device according to one exemplary embodiment. FIG. 2 illustrates a cross-sectional view cut along a line I-I' of FIG. 1.

Referring to FIGS. 1 and 2, the liquid crystal display device may include a first substrate 100, and a second substrate 200 combined with the first substrate 100 to accommodate a liquid crystal layer 300.

The first substrate 100 may include a first base substrate 110 on which a pixel region PA is defined. A gate line GL and a data line DL crossing the gate line GL are formed on the first base substrate 110. The pixel region PA may be formed by nth and (n+1)th gate lines GL extending in a direction D1, and nth and (n+1)th data lines DL extending in a direction D2 to cross the nth and (n+1)th gate lines GL. In the pixel region PA, a thin film transistor TR may be connected to a gate line GL and a data line DL, and a pixel electrode PE may be connected to the thin film transistor TR via a contact electrode CE and a connection electrode BE. A storage line STL may be formed to cross at least a portion of the pixel region PA.

The thin film transistor TR may include a gate electrode GE, a gate insulation layer 120, a semiconductor layer 130, a source electrode SE, and a drain electrode DE. The gate electrode GE may protrude from the gate line GL. The gate insulation layer 120 may be formed on the gate line GL and the gate electrode GE by using an insulating material. The semiconductor layer 130 may include an active layer (not shown) doped with an impurity, and may optionally include a resistive contact layer (not shown) formed on the active layer. The semiconductor layer 130 may be formed on the gate insulation layer 120 on a region where the gate electrode GE is formed. The source electrode SE may protrude from the data line DL and may be formed on the semiconductor layer 130.

The drain electrode DE may be formed at the same level as the source electrode SE. The drain electrode DE may include a first region DEa and a second region DEb. The first region DEa is an extending region of the drain electrode DE, and may overlap the storage line STL and may be in which the contact portion CT is formed. The second region DEb is an extending region of the drain electrode DE, which may extend from the first region DEa to overlap the pixel electrode PE and may have at least a portion overlapping an opening OA of a common electrode 250. The first region DEa of the drain electrode DE may be electrically connected to the contact electrode CE via, e.g., the contact portion CT. The contact portion CT may be, e.g., a hole formed in a passivation layer 140. The passivation layer 140 may be formed over the drain electrode DE, the source electrode SE, and the data line DL. A conductive material for forming the source electrode SE and the drain electrode DE may be a metal, e.g., a transparent metal oxide such as indium tin oxide (ITO) or indium zinc oxide (IZO).

The pixel electrode PE may be formed in the pixel region PA, and more particularly, on a region formed by the data line DL and the storage line STL crossing the data line DL. The pixel electrode PE may be formed on the passivation layer 140. Since the pixel electrode PE may be connected to the contact electrode CE via the connection electrode BE, and the contact electrode CE may be connected to the drain electrode DE of the thin film transistor TR via the contact portion CT, the pixel electrode PE may not be a sort of floating electrode.

The contact electrode CE may be formed by using the same material and at the same level as the pixel electrode PE, may be connected to the pixel electrode PE via the connection electrode BE, and may be connected to the first region DEa of the drain electrode DE of the thin film transistor TR via the contact portion CT.

The storage line STL may be formed to cross at least a portion of the pixel region PA. The storage line STL may be disposed between the pixel electrode PE and the gate line GL on a D1-D2 plane of FIG. 1. The storage line STL may include a first portion STLa extending in parallel with the gate line GL, and a second portion STLb split from the first portion STLa in a direction toward the pixel electrode PE and extending in parallel with the data line DL. The first portion STLa of the storage line STL may be disposed adjacent to the thin film transistor TR and may overlap the contact electrode CE. The first portion STLa of the storage line STL may be spaced apart from the pixel electrode such that the first portion STLa does not overlap the pixel electrode PE. The second portion STLb of the storage line STL may overlaps the pixel electrode PE. At least a portion of the second portion STLb may overlap the opening OA of the common electrode 250. The first portion STLa of the storage line STL may form a main capacitor Cst together with the first region DEa of the drain electrode DE. The second portion STLb of the storage line STL forms an auxiliary capacitor Csta together with the second region DEb of the drain electrode DE. The main and auxiliary capacitors Cst and Csta will be described in detail later.

The second substrate 200 may include a second base substrate 210, and a light blocking layer (not shown), a C/F layer 230, and the common electrode 250 sequentially formed on the second base substrate 210.

The light blocking layer may be formed to correspond to the gate line GL and the data line DL of the first substrate 100 by using, e.g., a conductive material. The light blocking layer may have a function of blocking light. The light blocking layer may be formed to correspond to the thin film transistor TR and the main capacitor Cst.

The C/F layer 230 may be formed to correspond to the pixel region PA.

The common electrode 250 is formed on the C/F layer 230. The common electrode 250 is formed to correspond to at least a portion of the pixel region PA. For example, the common electrode 250 may be formed to commonly correspond to the pixel electrode PE, the contact electrode CE, and the connection electrode BE. A common voltage Vcom may be applied to the common electrode 250. The common electrode 250 formed to correspond to the current pixel region PA may be connected to other common electrodes formed to correspond to other neighboring pixel regions.

The common electrode 250 may include the opening OA. The opening OA may be a color filter (C/F) ITO hole for effectively controlling the liquid crystal layer 300 intervened between the first and second substrates 100 and 200. The opening OA may be formed to correspond to at least a portion of the pixel electrode PE. For example, as illustrated in FIG. 1, the opening OA may be formed to correspond to a central portion of the pixel electrode PE.

According to the current embodiment, a liquid crystal capacitor Clc may be defined by the pixel electrode PE, the liquid crystal layer 300, and the common electrode 250. The main capacitor Cst may be defined by using the first portion STLa of the storage line STL as a lower electrode, using the first region DEa of the drain electrode DE overlapping the first portion STLa as an upper electrode, and using the gate insulation layer 120 intervened between the first portion STLa and the first region DEa as a dielectric layer. The auxiliary capacitor Csta may be defined by using the second portion STLb of the storage line STL as a lower electrode, using the second region DEb of the drain electrode DE overlapping the second portion STLb as an upper electrode, and using the gate insulation layer 120 intervened between the second portion STLb and the second region DEb as a dielectric layer.

The first portion STLa of the storage line STL and the first region DEa of the drain electrode DE for defining the main capacitor Cst overlap the contact electrode CE. The first region DEa of the drain electrode DE is connected to the contact electrode CE via the contact portion CT penetrating through the passivation layer 140. The first portion STLa of the storage line STL for forming the main capacitor Cst may have a predetermined area on the D1-D2 plane. The first region DEa of the drain electrode DE for forming the main capacitor Cst may overlap the first portion STLa of the storage line STL and may have a predetermined area on the D1-D2 plane.

The second portion STLb of the storage line STL and the second region DEb of the drain electrode DE for defining the auxiliary capacitor Csta may overlap each other. Each of the second portion STLb of the storage line STL and the second region DEb of the drain electrode DE may have a predetermined area on the D1-D2 plane. In particular, the auxiliary capacitor Csta may be formed to correspond to the opening OA of the common electrode 250 and to overlap the opening OA.

As such, the liquid crystal display device may have an improved aperture ratio by forming the auxiliary capacitor Csta to correspond to the opening OA of the common electrode 250, which may be a dead space. Since a capacitance is increased without reducing the aperture ratio, a reduction in kick-back and an improvement in display quality may be achieved.

In terms of process, since the storage line STL extends to form the lower electrode of the auxiliary capacitor Csta, a mask may not be additionally required to form a line and a lower electrode. Likewise, since the drain electrode DE extends to form the upper electrode of the auxiliary capacitor Csta, a mask may not be additionally required to form a thin film transistor electrode and an upper electrode.

Figure 3:
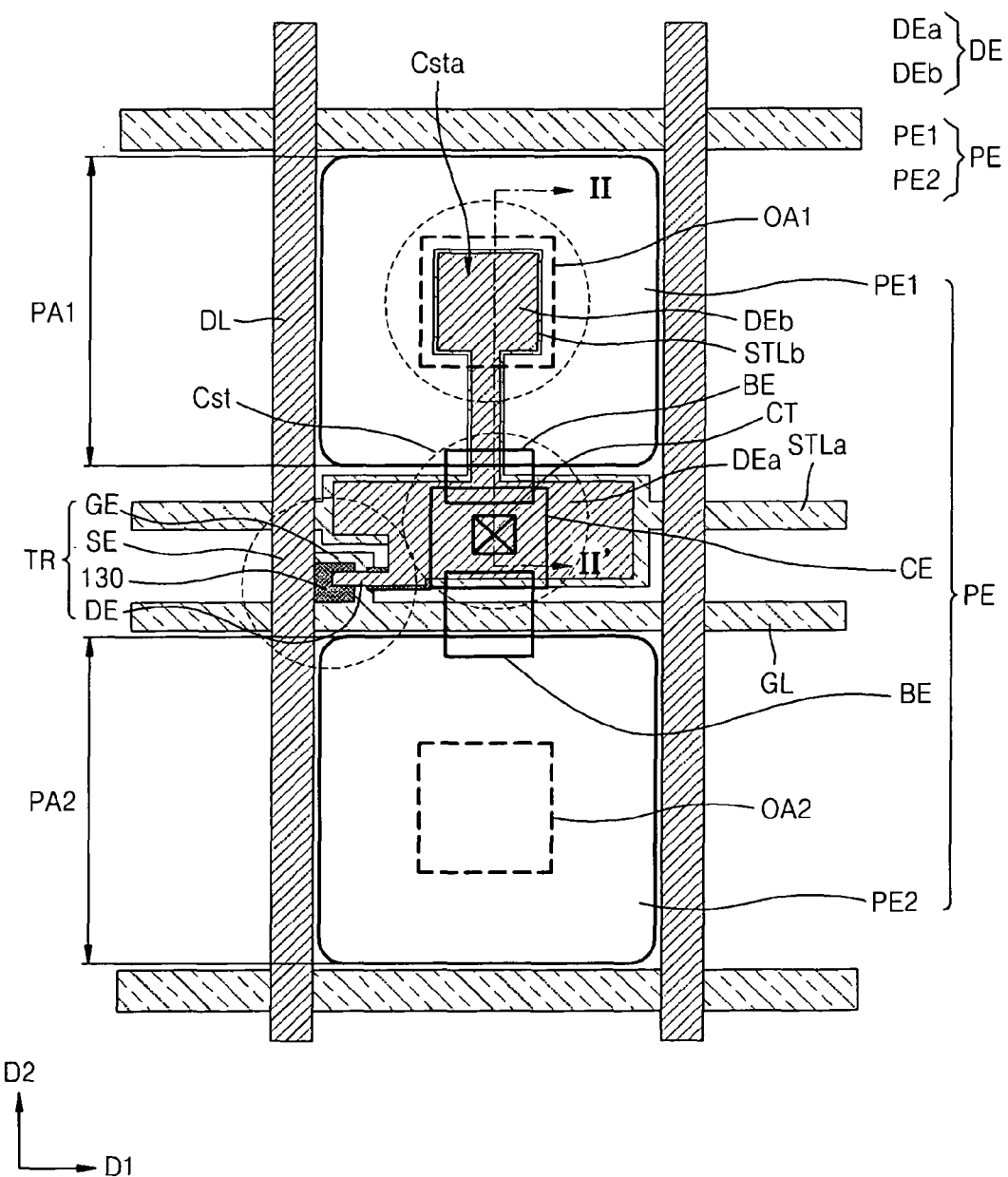
FIG. 3 illustrates a plan view of a liquid crystal display device, according to an exemplary embodiment.
Figure 4:
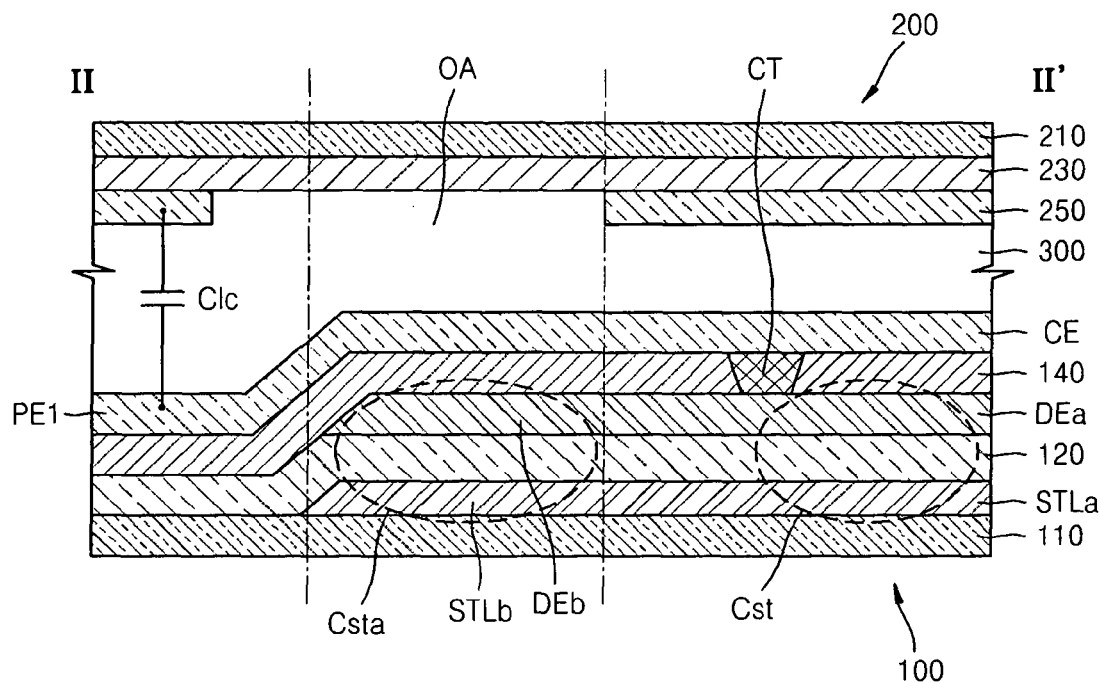
FIG. 4 illustrates a cross-sectional view cut along a line II-II' of FIG. 3.

FIG. 3 illustrates a plan view of a liquid crystal display device according to another exemplary embodiment. FIG. 4 illustrates a cross-sectional view cut along a line II-II' of FIG. 3.

Referring to FIGS. 3 and 4, the liquid crystal display device may be distinguished from the liquid crystal display device illustrated in FIGS. 1 and 2 in that the pixel region PA is divided into a first subpixel region PA1 and a second subpixel region PA2, and that a first pixel electrode PE1 and a second pixel electrode PE2 are formed to correspond to the first and second subpixel regions PA1 and PA2, respectively. Otherwise, the liquid crystal display device according to this exemplary embodiment may be the same as or similar to the liquid crystal display device illustrated in FIGS. 1 and 2 in structures of, e.g., the thin film transistor TR, the auxiliary capacitor Csta, and the main capacitor Cst, and thus repeated descriptions thereof may be omitted here.

Referring to FIG. 3, the liquid crystal display device may include the first substrate 100, the second substrate 200, and the liquid crystal layer 300 intervened between the first and second substrates 100 and 200.

The first substrate 100 may include the first base substrate 110 on which the pixel region PA is defined. The pixel region PA may include the first and second subpixel regions PA1 and PA2 that are split from each other by the gate line GL and the storage line STL. In comparison to FIGS. 1 and 2, in FIGS. 3 and 4, the gate line GL and the storage line STL may be formed to cross between the first and second subpixel regions PA1 and PA2.

As in FIGS. 1 and 2, the thin film transistor TR formed on the first substrate 100 may include the gate electrode GE, the semiconductor layer 130, the source electrode SE, and the drain electrode DE, and thus repeated descriptions thereof are omitted here. The drain electrode DE of the thin film transistor TR may include the first and second regions DEa and DEb. The first region DEa may be an extending region of the drain electrode DE. The first region DEa may overlap the storage line STL and may be connected to the contact electrode CE via the contact portion CT. The second region Deb may be an extending region of the drain electrode DE, which may extend from the first region DEa to overlap the pixel electrode PE and of which at least a portion may overlap the opening OA of the common electrode 250.

The pixel electrode PE may be formed in the pixel region PA. The pixel electrode PE may include the first and second pixel electrodes PE1 and PE2. The first pixel electrode PE1 may be formed in the first subpixel region PA1, and the second pixel electrode PE2 may be formed in the second subpixel region PA2. The first and second pixel electrodes PE1 and PE2 may be connected to each other via the contact electrode CE and the connection electrodes BE. As such, since the first and second pixel electrodes PE1 and PE2 may be connected to the contact electrode CE, and the contact electrode CE may be connected to the drain electrode DE of the thin film transistor TR via the contact portion CT, the first and second pixel electrodes PE1 and PE2 may not be a sort of floating electrodes.

In FIGS. 3 and 4, the contact electrode CE may be formed between the first and second pixel electrodes PE1 and PE2. The contact electrode CE may be formed by using the same material and at the same level as the first and second pixel electrodes PE1 and PE2. The contact electrode CE may be connected to the first and second pixel electrodes PE1 and PE2 via the connection electrodes BE, and may be connected to the first region DEa of the drain electrode DE of the thin film transistor TR via the contact portion CT.

The storage line STL may be formed to cross between the first and second subpixel regions PA1 and PA2. The storage line STL may be disposed between the first pixel electrode PE1 and the gate line GL on a D1-D2 plane of FIG. 3. The storage line STL may include the first portion STLa extending in a direction parallel to the gate line GL, and the second portion STLb split from the first portion STLa in a direction toward the first pixel electrode PE1 and extending in a direction parallel to the data line DL. That is, the second portion STLb may extend perpendicularly to the gate line GL.

The first portion STLa of the storage line STL may be disposed adjacent to the thin film transistor TR and may overlap the contact electrode CE. The first portion STLa of the storage line STL may be spaced apart from the first electrode PE1 such that the first portion STLa does not overlap the first pixel electrode PE1. The second portion STLb of the storage line STL may overlaps the first pixel electrode PE1, and at least a portion of the second portion STLb may overlap a first opening OA1 of the common electrode 250. The first portion STLa of the storage line STL may form the main capacitor Cst together with the first region DEa of the drain electrode DE, and the second portion STLb of the storage line STL may form the auxiliary capacitor Csta together with the second region DEb of the drain electrode DE. The main and auxiliary capacitors Cst and Csta will be described in detail later.

Similarly to FIGS. 1 and 2, the second substrate 200 may include the second base substrate 210, the light blocking layer, the C/F layer 230, and the common electrode 250 sequentially formed on the second base substrate 210.

The common electrode 250 may be formed to correspond to at least a portion of the pixel region PA. For example, the common electrode 250 may be formed to commonly correspond to the first pixel electrode PE1, the second pixel electrode PE2, the contact electrode CE, and the connection electrodes BE. A common voltage Vcom may be applied to the common electrode 250.

The common electrode 250 may include the first opening OA1 and a second opening OA2 formed to respectively correspond to the first and second subpixel regions PA1 and PA2. For example, as illustrated in FIG. 3, the first opening OA1 may be formed to correspond to a central portion of the first pixel electrode PE1, and the second opening OA2 may be formed to correspond to a central portion of the second pixel electrode PE2.

According to this exemplary embodiment, the liquid crystal capacitor Clc may be defined by the first pixel electrode PE1, the second pixel electrode PE2 connected to the first pixel electrode PE1, the liquid crystal layer 300, and the common electrode 250. The main capacitor Cst may be defined by using the first portion STLa of the storage line STL as a lower electrode, using the first region DEa of the drain electrode DE overlapping the first portion STLa as an upper electrode, and using the gate insulation layer 120 intervened between the first portion STLa and the first region DEa as a dielectric layer. The auxiliary capacitor Csta may be defined by using the second portion STLb of the storage line STL as a lower electrode, using the second region DEb of the drain electrode DE overlapping the second portion STLb as an upper electrode, and using the gate insulation layer 120 intervened between the second portion STLb and the second region DEb as a dielectric layer.

The first portion STLa of the storage line STL and the first region DEa of the drain electrode DE for defining the main capacitor Cst may overlap the contact electrode CE. The first region DEa of the drain electrode DE may be connected to the contact electrode CE via the contact portion CT penetrating through the passivation layer 140. The first portion STLa of the storage line STL for forming the main capacitor Cst may have a predetermined area on the D1-D2 plane. The first region DEa of the drain electrode DE for forming the main capacitor Cst may overlap the first portion STLa of the storage line STL and may have a predetermined area on the D1-D2 plane.

The second portion STLb of the storage line STL and the second region DEb of the drain electrode DE for defining the auxiliary capacitor Csta may overlap each other. Each of the second portion STLb of the storage line STL and the second region DEb of the drain electrode DE may have a predetermined area on the D1-D2 plane. In particular, the auxiliary capacitor Csta may be formed to correspond to the first opening OA1 of the common electrode 250 and to overlap the first opening OA1.

As such, the liquid crystal display device may have an improved aperture ratio, a reduced kick-back, and/or an improved display quality by forming the auxiliary capacitor Csta in the first opening OA1 of the common electrode 250, which may be a dead space.

In terms of process, since the storage line STL extends to form the lower electrode of the auxiliary capacitor Csta, a mask may not be additionally required to form a line and a lower electrode. Likewise, since the drain electrode DE may extend to form the upper electrode of the auxiliary capacitor Csta, a mask may not be additionally required to form a thin film transistor electrode and an upper electrode.

Figure 5:
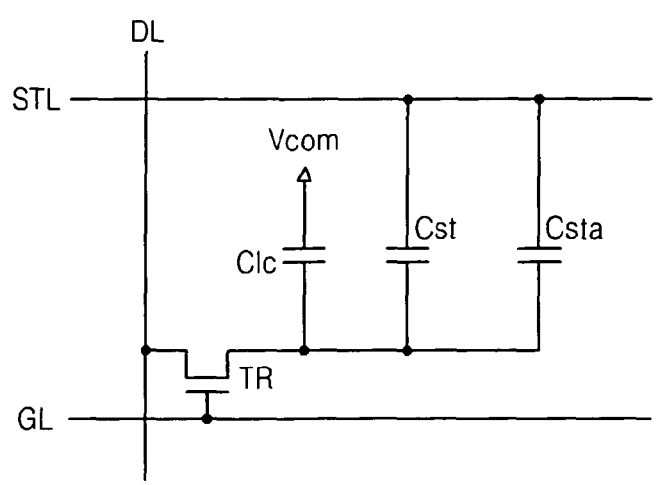
FIG. 5 illustrates an equivalent circuit diagram of the liquid crystal display devices illustrated in FIGS. 1 and 3.

FIG. 5 is an equivalent circuit diagram of the liquid crystal display device illustrated in FIG. 1 or 3.

Referring to FIG. 5, the thin film transistor TR may have a control terminal connected to the gate line GL, a source terminal connected to the data line DL, and a drain terminal connected to the liquid crystal capacitor Clc, the main capacitor Cst, and the auxiliary capacitor Csta. The liquid crystal capacitor Clc may have one end connected to the common electrode 250 to which a common voltage Vcom is applied, and another end connected to the drain terminal. Each of the main capacitor Cst and the auxiliary capacitor Csta may have one end connected to the storage line STL, and another end connected to the drain terminal.

In a driving operation, a gate voltage may be applied to turn on the thin film transistor TR such that a data voltage applied from the data line DL is output to the drain terminal. The output data voltage may be charged in the main capacitor Cst and the auxiliary capacitor Csta connected to the drain terminal. Since the main capacitor Cst and the auxiliary capacitor Csta may be connected in parallel, a charge capacity of the liquid crystal display device may be increased in comparison to a case when only the main capacitor Cst exists. As described above in relation to FIGS. 1 through 4, since the auxiliary capacitor Csta may be disposed to correspond to the first opening OA1, an aperture ratio may not be reduced.

In FIGS. 3 and 4, the gate line GL may be formed to cross the first and second subpixel regions PA1 and PA2. Since the storage line STL may be formed at the same level as the gate line GL, the second portion STLb of the storage line STL may be blocked by the gate line GL and thus may not be able to split and extend toward the second subpixel region PA2. Accordingly, in FIGS. 3 and 4, the auxiliary capacitor Csta may be formed to correspond to only the first opening OA1.

As such, in FIGS. 3 and 4, a difference in capacitance and a difference in aperture ratio may occur between upper and lower subpixels.

Figure 6:
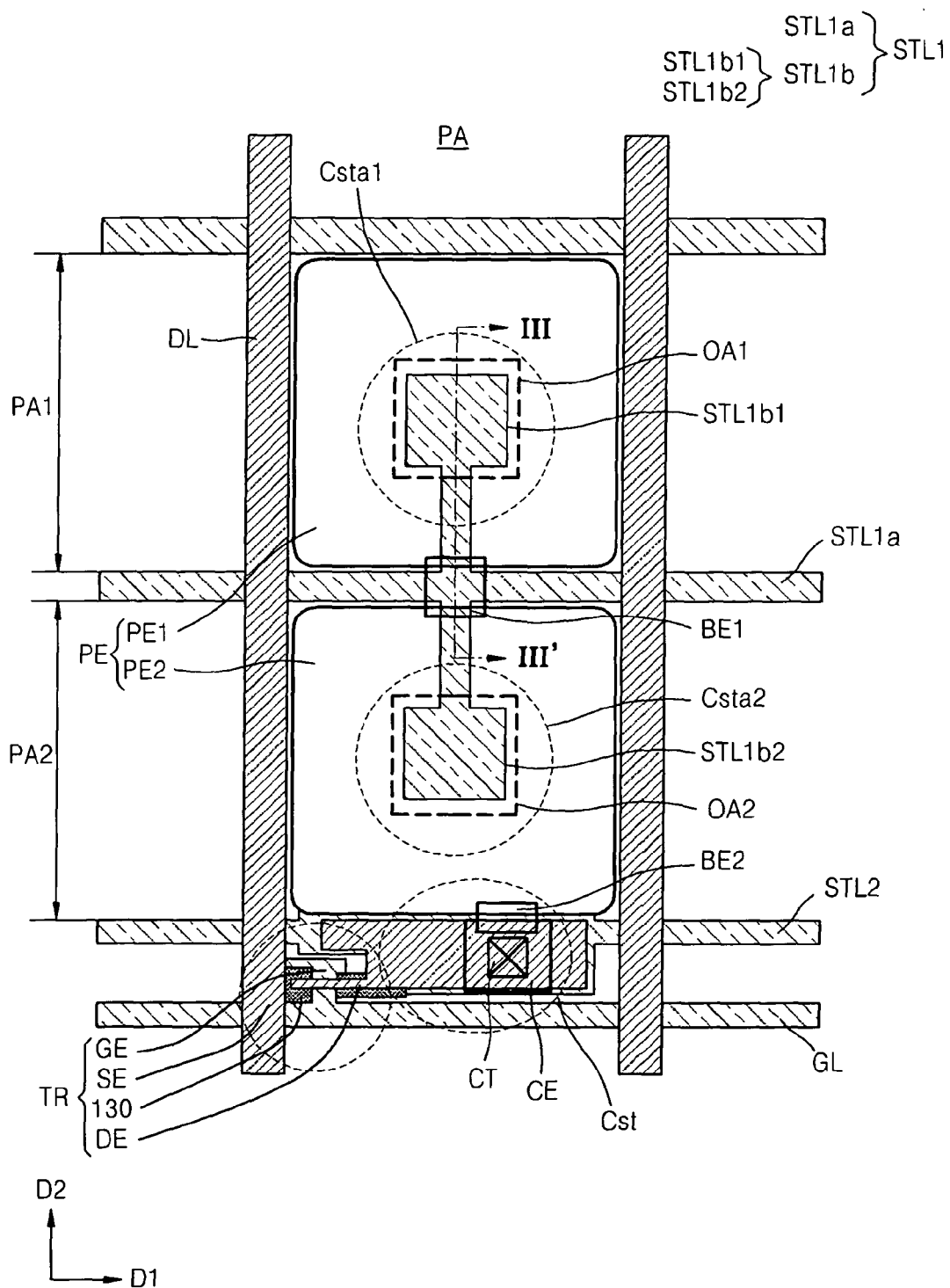
FIG. 6 illustrates a plan view of a liquid crystal display device, according to an exemplary embodiment.
Figure 7:
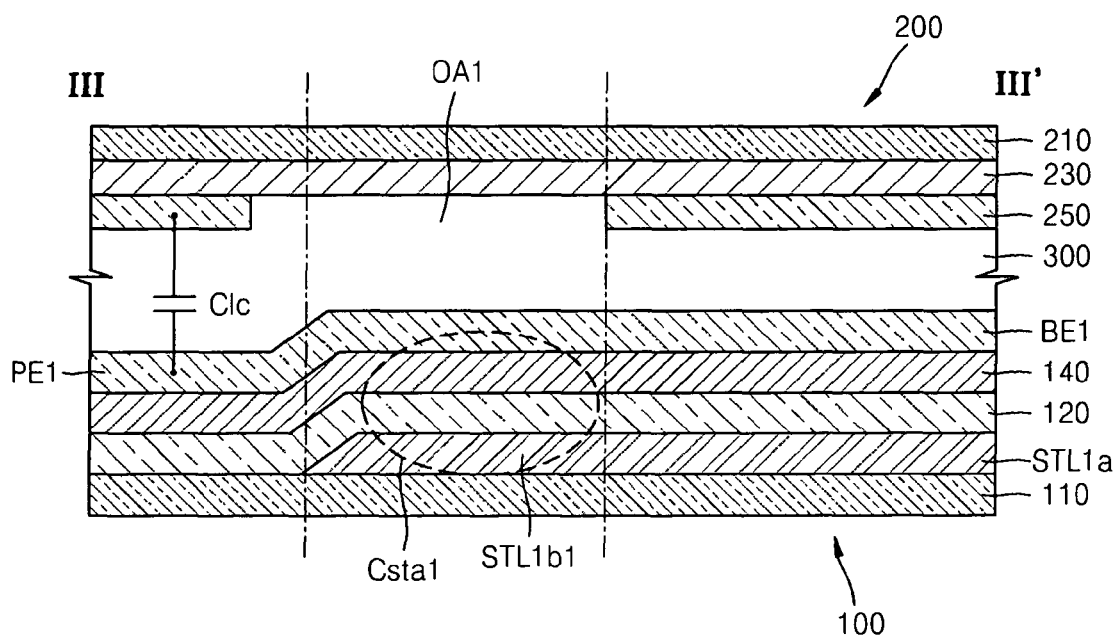
FIG. 7 illustrates a cross-sectional view cut along a line III-III' of FIG. 6.

FIG. 6 illustrates a plan view of a liquid crystal display device according to another exemplary embodiment. FIG. 7 illustrates a cross-sectional view cut along a line III-III' of FIG. 6.

Referring to FIGS. 6 and 7, the liquid crystal display device may be distinguished from the liquid crystal display device illustrated in FIGS. 3 and 4 in that a first auxiliary capacitor Csta1 and a second auxiliary capacitor Csta2 are formed to overlap the first and second openings OA1 and OA2, respectively, and that the first and second auxiliary capacitors Csta1 and Csta2 are formed by the storage line STL and the first and second pixel electrodes PE1 and PE2. The gate line GL, the thin film transistor TR, and the main capacitor Cst may not disposed between the first and second subpixel regions PA1 and PA2. Otherwise, the liquid crystal display device may be the same as or similar to the liquid crystal display device illustrated ones of FIGS. 1-4, e.g., in that the pixel region PA may be divided into the first and second subpixel regions PA1 and PA2, in that the first and second pixel electrodes PE1 and PE2 may be formed to correspond to the first and second subpixel regions PA1 and PA2, respectively, and in the structures of the thin film transistor TR and the main capacitor Cst, and thus repeated descriptions thereof may be omitted here.

The liquid crystal display device may include the first substrate 100, the second substrate 200, and the liquid crystal layer 300 intervened between the first and second substrates 100 and 200.

The first substrate 100 may include the first base substrate 110 on which the pixel region PA is defined. The gate line GL and the data line DL crossing the gate line GL are formed on the first base substrate 110. The pixel region PA may be formed by nth and (n+1)th gate lines GL extending in a direction D1, and nth and (n+1)th data lines DL extending in a direction D2 to cross the nth and (n+1)th gate lines GL. The pixel region PA may include the first and second subpixel regions PA1 and PA2 that are divided by the first storage line STL1.

In comparison to FIGS. 3 and 4, in FIGS. 6 and 7, the gate line GL may not cross between the first and second subpixel regions PA1 and PA2. The gate line GL may be formed under the second subpixel region PA2 in parallel with the first storage line STL1 on a D1-D2 plane. The second storage line STL2 may be formed under the second subpixel region PA2 adjacent to and in parallel with the gate line GL on the D1-D2 plane.

Since the gate line GL may not disposed between the first and second subpixel regions PA1 and PA2, the first storage line STL1 may be split in two directions toward the first and second subpixel regions PA1 and PA2.

As in FIGS. 3 and 4, the thin film transistor TR formed on the first substrate 100 may include the gate electrode GE, the semiconductor layer 130, the source electrode SE, and the drain electrode DE, and thus repeated descriptions thereof are omitted here. The drain electrode DE of the thin film transistor TR may extend to overlap the second storage line STL2 and may be connected to the contact electrode CE via the contact portion CT.

The pixel electrode PE may be formed in the pixel region PA, and may include the first and second pixel electrodes PE1 and PE2. The first pixel electrode PE1 may be formed in the first subpixel region PA1, and the second pixel electrode PE2 may be formed in the second subpixel region PA2. The first and second pixel electrodes PE1 and PE2 may be connected to each other via a first connection electrode BE1. The second pixel electrode PE2 may be connected to the contact electrode CE via a second connection electrode BE2. As such, since the first and second pixel electrodes PE1 and PE2 may be connected to the contact electrode CE, and the contact electrode CE may be connected to the drain electrode DE of the thin film transistor TR via the contact portion CT, the first and second pixel electrodes PE1 and PE2 may not be a sort of floating electrodes.

In FIGS. 6 and 7, the contact electrode CE may be formed under the second pixel electrode PE2 on the D1-D2 plane. The contact electrode CE may be formed by using the same material and at the same level as the pixel electrode PE, and may be connected to the second pixel electrode PE2 via the second connection electrode BE2.

The first storage line STL1 may be formed to cross between the first and second subpixel regions PA1 and PA2. The first storage line STL1 may include a first portion STL1a extending in parallel with the gate line GL. The first storage line STL1 may include a second portion STL1b split from the first portion STL1a in two directions toward the first and second pixel electrodes PE1 and PE2 and extending in parallel with the data line DL. The second portion STL1b of the first storage line STL1 may include a second-1 sub-portion STL1b1 extending to overlap the first pixel electrode PE1 and forming the first auxiliary capacitor Csta1. The second portion STL1b of the first storage line STL1 may further include a second-2 sub-portion STL1b2 extending to overlap the second pixel electrode PE2 and forming the second auxiliary capacitor Csta2. The first and second auxiliary capacitors Csta1 and Csta2 will be described in detail later.

The second storage line STL2 may be disposed adjacent to the thin film transistor TR and may overlap the extending drain electrode DE. Thus, forming the main capacitor Cst. The extending drain electrode DE and the second storage line STL2 may have a predetermined area on the D1-D2 plane.

Similarly to FIGS. 3 and 4, the second substrate 200 may include the second base substrate 210, the light blocking layer, the C/F layer 230, and the common electrode 250 formed, e.g., sequentially formed, on the second base substrate 210.

The common electrode 250 may be formed to correspond to at least a portion of the pixel region PA. The common electrode 250 may include the first and second openings OA1 and OA2 formed to respectively correspond to the first and second subpixel regions PA1 and PA2. For example, as illustrated in FIG. 6, the first opening OA1 may be formed to correspond to a central portion of the first pixel electrode PE1, and the second opening OA2 may be formed to correspond to a central portion of the second pixel electrode PE2.

The liquid crystal capacitor Clc may be defined by the first pixel electrode PE1, the second pixel electrode PE2 connected to the first pixel electrode PE1, the liquid crystal layer 300, and the common electrode 250. The first auxiliary capacitor Csta1 may be defined by using the second-1 sub-portion STL1b1 of the second portion STL1b of the first storage line STL1 as a lower electrode, using the first pixel electrode PE1 overlapping the second-1 sub-portion STL1b1 as an upper electrode, and using the gate insulation layer 120 intervened between the second-1 sub-portion STL1b1 and the first pixel electrode PE1 as a dielectric layer. The second auxiliary capacitor Csta2 may be defined by using the second-2 sub-portion STL1b2 of the second portion STL1b of the first storage line STL1 as a lower electrode, using the second pixel electrode PE2 overlapping the second-2 sub-portion STL as an upper electrode, and using the gate insulation layer 120 intervened between the second-2 portion STL1b2 and the second pixel electrode PE2 as a dielectric layer.

Each of the second-1 and second-2 sub-portions STL1b1 and STL1b2 of the first storage line STL1, e.g., for defining the first auxiliary capacitor Csta1, may have a predetermined area on the D1-D2 plane. The first auxiliary capacitor Csta1 may be formed to correspond to the first opening OA1 of the common electrode 250 and may overlap the first opening OA1. The second auxiliary capacitor Csta2 may be formed to correspond to the second opening OA2 of the common electrode 250 and may overlap the second opening OA2.

Figure 8:
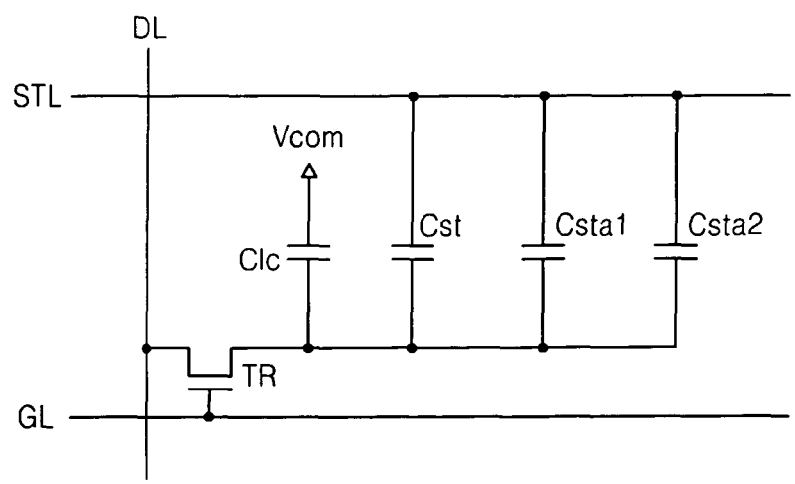
FIG. 8 illustrates an equivalent circuit diagram of the liquid crystal display device illustrated in FIG. 6.

FIG. 8 illustrates an equivalent circuit diagram of the liquid crystal display device illustrated in FIG. 6.

Referring to FIG. 8, the thin film transistor TR may have a control terminal connected to the gate line GL, a source terminal connected to the data line DL, and a drain terminal connected to the liquid crystal capacitor Clc, the main capacitor Cst, and the first and second auxiliary capacitors Csta1 and Csta2. The liquid crystal capacitor Clc may have one end connected to the common electrode 250 to which a common voltage Vcom is applied, and another end connected to the drain terminal. The main capacitor Cst may have one end connected to the storage line STL, and another end connected to the drain terminal. Each of the first and second auxiliary capacitors Csta1 and Csta2 may have one end connected to the storage line STL, and another end coupled to the pixel electrode PE connected to the drain electrode DE via the contact electrode CE.

If a gate voltage is applied, the thin film transistor TR may be turned on such that a data voltage applied from the data line DL is output to the drain terminal. The output data voltage may be charged in the main capacitor Cst and the first and second auxiliary capacitors Csta1 and Csta2 each having the other end coupled to the drain terminal. Since the main capacitor Cst, the first auxiliary capacitor Csta1, and the second auxiliary capacitor Csta2 may be connected in parallel, a charge capacity of the liquid crystal display device may be increased in comparison to a case when only the main capacitor Cst exists. Since the first and second auxiliary capacitors Csta1 and Csta2 may be disposed to respectively correspond to the first and second openings OA1 and OA2, an aperture ratio may not be reduced.

As such, the liquid crystal display device may have an improved aperture ratio by forming the first and second auxiliary capacitors Csta1 and Csta2 to respectively correspond to the first and second openings OA1 and OA2 of the common electrode 250, which may be dead spaces. Since a capacitance may be increased without reducing the aperture ratio, a reduction in kick-back and an improvement in display quality may be achieved. In particular, since the first and second auxiliary capacitors Csta1 and Csta2 are formed to correspond to both of the first and second openings OA1 and OA2, the aperture ratio may be further improved.

Furthermore, in FIGS. 6 and 7, since the first and second auxiliary capacitors Csta1 and Csta2 may be formed on both of upper and lower subpixels, a difference in capacitance and a difference in aperture ratio may not occur between the upper and lower subpixels.

In terms of process, since the first storage line STL1 extends to form the lower electrodes of the first and second auxiliary capacitors Csta1 and Csta2, a mask may not be additionally required to form a line and a lower electrode.

As described above, an aperture ratio of a liquid crystal display device may be improved by disposing a capacitor to correspond to an opening of a common electrode, which may be a dead space. As such, a display quality may be improved without reducing an aperture ratio even when a capacitor is added.

Also, a balance between upper and lower subpixel regions may be achieved by changing a position of a gate line and thus disposing first and second auxiliary capacitors to respectively correspond to first and second openings of a common electrode in the first and second subpixel regions.

By summation and review, a liquid crystal display device may include an array substrate, a color filter (C/F) substrate facing the array substrate, and a liquid crystal layer formed between the array substrate and the C/F substrate. The array substrate may be formed of a plurality of pixels as minimum units for displaying an image. Each of the pixels may include, e.g., a gate line, a data line, a thin film transistor, and a pixel electrode. The gate line and the data line may receive a gate signal and a data signal, respectively, and may be electrically connected to a gate and a source of the thin film transistor, respectively. The pixel electrode may be electrically connected to a drain of thin film transistor, and may face a common electrode formed on the C/F substrate with respect to the liquid crystal layer.

Recently, patterned vertical alignment (PVA) mode, multi-domain patterned vertical alignment (M-PVA) mode, and super-patterned vertical alignment (S-PVA) mode liquid crystal display devices having wide viewing angles have been developed. These liquid crystal display devices may be manufactured by aligning liquid crystal molecules in different directions by using patterned transparent electrodes to form a liquid crystal domain, and thus may have improved viewing angles. In the liquid crystal display devices having wide viewing angles, C/F indium tin oxide (ITO) holes may be formed in a common electrode on a C/F substrate in order to effectively control liquid crystals. However, since the C/F ITO holes are dead spaces, a reduction in aperture ratio may occur. Therefore, embodiments relate to a liquid crystal display device having an improved aperture ratio by forming a capacitor to correspond to an opening of a common electrode, e.g., a opening on a C/F substrate.

While the present invention has been particularly shown and described with reference to exemplary embodiments thereof, it will be understood by those of ordinary skill in the art that various changes in form and details may be made therein without departing from the spirit and scope of the present invention as defined by the following claims. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

What is claimed is:

1. A liquid crystal display device, comprising:
a pixel region including a first location and a second location, the pixel region being defined by a gate line and a data line crossing each other;
a pixel electrode on a first substrate at the second location;
a thin film transistor on the first substrate at the first location, the thin film transistor including a gate electrode, a semiconductor layer insulated from the gate electrode, and a source electrode and a drain electrode electrically connected to the semiconductor layer;
a storage line on the first substrate in the pixel region, the storage line including a first portion at the first location extending in a direction parallel to the gate line, and a second portion at the second location, the second portion being split from the first portion in a direction toward the pixel electrode and extending in a direction parallel to the data line;
a common electrode corresponding to the pixel region on a second substrate combined with the first substrate to accommodate a liquid crystal layer;
an opening in at least a portion of the common electrode corresponding to the pixel electrode;
the drain electrode of the thin film transistor including a first region overlapping the first portion of the storage line and a second region overlapping the second portion of the storage line; and
the second portion of the storage line and the second region of the drain electrode extending to correspond to the opening and to overlap the opening, wherein the common electrode overlaps a contact region between the pixel electrode and the drain electrode.

2. The liquid crystal display device of claim 1, further comprising a gate insulation layer between the second portion of the storage line and the second region of the drain electrode.

3. The liquid crystal display device of claim 2, wherein the second portion of the storage line, the gate insulation layer, and the second region of the drain electrode form an auxiliary capacitor, the auxiliary capacitor overlapping the opening.

4. The liquid crystal display device of claim 1, further comprising a contact electrode at the first location and at a same level as the pixel electrode and electrically connected to the pixel electrode and the drain electrode.

5. The liquid crystal display device of claim 4, wherein the first portion of the storage line overlapping the contact electrode and the first region of the drain electrode insulated from the first portion of the storage line form a main capacitor, wherein the main capacitor located at the first location does not overlap the pixel electrode.

6. A liquid crystal display device, comprising:
a pixel electrode on a first substrate in a pixel region including a first subpixel region, a second subpixel region, and a margin region between the first and second subpixel regions, the pixel electrode including a first pixel electrode in the first subpixel region and a second pixel electrode in the second subpixel region;
a thin film transistor on the first substrate in the margin region, the thin film transistor including a gate electrode, a semiconductor layer insulated from the gate electrode, and a source electrode and a drain electrode electrically connected to the semiconductor layer;
a gate line electrically connected to the gate electrode and crossing between the first and second subpixel regions;
a storage line on the first substrate in the pixel region, the storage line including a first portion in the margin region extending in a direction parallel to the gate line, and a second portion in the first subpixel region and split from the first portion in a direction toward the pixel electrode and extending in a direction perpendicular to the gate line;
a common electrode corresponding to the pixel region on a second substrate combined with the first substrate to accommodate a liquid crystal layer;
an opening in at least a portion of the common electrode corresponding to the pixel electrode;
the drain electrode of the thin film transistor including a first region overlapping the first portion of the storage line and a second region overlapping the second portion of the storage line; and the second portion of the storage line and the second region of the drain electrode extending to correspond to the opening and to overlap the opening.

7. The liquid crystal display device of claim 6, wherein the thin film transistor is between the first and second subpixel regions.

8. The liquid crystal display device of claim 6, wherein the first portion of the storage line crosses between the first and second subpixel regions.

9. The liquid crystal display device of claim 6, wherein the opening includes:
   a first opening corresponding to at least a portion of the first pixel electrode; and
   a second opening corresponding to at least a portion of the second pixel electrode.

10. The liquid crystal display device of claim 9, wherein the second portion of the storage line and the second region of the drain electrode extend to correspond to the first opening and to overlap the first opening.

11. The liquid crystal display device of claim 9, further comprising a gate insulation layer between the second portion of the storage line and the second region of the drain electrode.

12. The liquid crystal display device of claim 11, wherein the second portion of the storage line, the gate insulation layer, and the second region of the drain electrode form an auxiliary capacitor, the auxiliary capacitor overlapping the first opening.

13. The liquid crystal display device of claim 6, further comprising a contact electrode at the same level as the first and second pixel electrodes and electrically connected to the first and second pixel electrodes, the contact electrode being between the first and second pixel electrodes.

14. The liquid crystal display device of claim 13, wherein the first portion of the storage line overlapping the contact electrode and the first region of the drain electrode insulated from the first portion of the storage line form a main capacitor, the main capacitor being between the first and second subpixel regions, wherein the main capacitor does not overlap the first pixel electrode and the second pixel electrode.

15. A liquid crystal display device comprising:
   a pixel electrode on a first substrate in a pixel region defined by a gate line and a data line crossing each other, the pixel region including a first subpixel region and a second subpixel region, the pixel electrode including a first pixel electrode in the first subpixel region and a second pixel electrode in the second subpixel region;
   a thin film transistor on the first substrate in the pixel region, the thin film transistor including a gate electrode, a semiconductor layer insulated from the gate electrode, and a source electrode and a drain electrode electrically connected to the semiconductor layer;
   a first storage line on the first substrate to cross between the first and second subpixel regions, the first storage line including a first portion extending in a direction parallel to the gate line, and a second portion and a third portion split from the first portion in a direction toward the first and second pixel electrodes respectively and extending in a direction parallel to the data line;
   a second storage line that overlaps the thin film transistor and extends in a direction parallel to the gate line;
   a common electrode corresponding to the pixel region on a second substrate combined with the first substrate to accommodate a liquid crystal layer;
   an opening in at least a portion of the common electrode corresponding to the pixel electrode;
   the first pixel electrode overlapping the second portion of the first storage line and the second pixel electrode overlapping the third portion of the first storage line; and
   the second and third portions of the first storage line extending to correspond to the opening and to overlap the opening.

16. The liquid crystal display device of claim 15, wherein the thin film transistor is on a plane under the second subpixel region.

17. The liquid crystal display device of claim 15, wherein the second storage line is on a plane under the second, and
   wherein the gate line is electrically connected to the gate electrode and is on a plane under the second subpixel region in a direction parallel to the first storage line.

18. The liquid crystal display device of claim 15, wherein the opening includes:
   a first opening corresponding to at least a portion of the first pixel electrode; and
   a second opening corresponding to at least a portion of the second pixel electrode.

19. The liquid crystal display device of claim 18, further comprising a gate insulation layer and a passivation layer between the second portion of the first storage line and the first and second pixel electrodes.

20. The liquid crystal display device of claim 19, wherein:
   the second portion of the first storage line, the gate insulation layer, the passivation layer, and the first pixel electrode form a first auxiliary capacitor, the first auxiliary capacitor overlapping the first opening; and
   the second portion of the first storage line, the gate insulation layer, the passivation layer, and the second pixel electrode form a second auxiliary capacitor, the second auxiliary capacitor overlapping the second opening.

21. The liquid crystal display device of claim 15, further comprising a connection electrode at the same level as the first and second pixel electrodes and electrically connected to the first and second pixel electrodes, the connection electrode being between the first and second pixel electrodes.

* * * * *